United States Patent
Deng

(10) Patent No.: US 9,142,121 B2
(45) Date of Patent: Sep. 22, 2015

(54) INFORMATION PROCESSING METHOD AND USER EQUIPMENT

(71) Applicant: Huawei Device Co., Ltd., Shenzhen, Guangdong (CN)

(72) Inventor: Junjie Deng, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 136 days.

(21) Appl. No.: 13/691,428

(22) Filed: Nov. 30, 2012

(65) Prior Publication Data

US 2013/0099939 A1 Apr. 25, 2013

Related U.S. Application Data

(63) Continuation of application No. PCT/CN2011/074939, filed on May 31, 2011.

(30) Foreign Application Priority Data

May 31, 2010 (CN) .......................... 2010 1 0188549

(51) Int. Cl.
- G08B 23/00 (2006.01)
- G08C 17/02 (2006.01)
- H04M 1/725 (2006.01)

(52) U.S. Cl.
CPC ........... *G08C 17/02* (2013.01); *H04M 1/72547* (2013.01); *H04M 1/72569* (2013.01); *H04M 2250/12* (2013.01)

(58) Field of Classification Search
CPC ..... H04W 12/06; H04W 12/08; H04W 36/32; H04W 48/02; H04W 4/046; H04W 4/12; H04W 4/206; H04W 76/021; H04W 84/005; H04W 4/22; H04W 47/02; H04W 76/007; H04W 84/16; H04W 48/00; H04W 4/021

USPC ........... 340/870.02, 7.61, 521, 539.22, 426.2, 340/426.21, 426.22, 474, 502, 683, 692, 340/310.13, 815.79

See application file for complete search history.

(56) References Cited

U.S. PATENT DOCUMENTS

| | | | |
|---|---|---|---|
| 2002/0127998 A1* | 9/2002 | Katayanagi | 455/412 |
| 2002/0137552 A1 | 9/2002 | Cannon et al. | |

(Continued)

FOREIGN PATENT DOCUMENTS

| | | |
|---|---|---|
| CN | 1332590 A | 1/2002 |
| CN | 1678183 A | 10/2005 |

(Continued)

OTHER PUBLICATIONS

First office action issued in corresponding Chinese patent application No. 201010188549.X, dated Jan. 31, 2012, and English translation thereof, total 15 pages.

(Continued)

*Primary Examiner* — Daniel Previl
(74) *Attorney, Agent, or Firm* — Huawei Device Co., Ltd.

(57) ABSTRACT

An apparatus and method for processing an information processing request in a mobile device. In one embodiment, the method includes: receiving an information processing request message; collecting at least one type of environmental state information associated with the mobile device if the information processing request message is not processed by the mobile device within a predetermined time; generating prompt information according to the collected environmental state information, wherein the prompting information is used to prompt a user to process the unprocessed information processing request message. Therefore, a user can timely perceive the information processing request message that has been received but not processed by the mobile device in time, thus effectively increasing the usability of the mobile device.

11 Claims, 5 Drawing Sheets

(56) References Cited

U.S. PATENT DOCUMENTS

| | | | |
|---|---|---|---|
| 2004/0203673 A1* | 10/2004 | Seligmann | 455/415 |
| 2006/0205364 A1* | 9/2006 | Chen | 455/90.3 |
| 2006/0293037 A1* | 12/2006 | Signore | 455/417 |
| 2007/0139183 A1 | 6/2007 | Kates | |
| 2007/0149253 A1* | 6/2007 | Lee et al. | 455/569.1 |
| 2007/0182524 A1* | 8/2007 | Tushinsky et al. | 340/7.61 |
| 2007/0192067 A1* | 8/2007 | Wong et al. | 702/189 |
| 2008/0132290 A1* | 6/2008 | Sharabi et al. | 455/567 |
| 2009/0088204 A1* | 4/2009 | Culbert et al. | 455/556.1 |
| 2009/0186654 A1* | 7/2009 | Chen et al. | 455/556.1 |

FOREIGN PATENT DOCUMENTS

| | | | |
|---|---|---|---|
| CN | 1980258 A | 6/2007 | |
| CN | 101009887 A | 8/2007 | |
| CN | 101227666 A | 7/2008 | |
| CN | 101252735 A | 8/2008 | |
| CN | 101341521 A | 1/2009 | |
| CN | 101640723 A | 2/2010 | |
| CN | 101854435 A | 10/2010 | |
| EP | 1379064 A2 | 1/2004 | |
| JP | 2002261882 A | 9/2002 | |
| JP | 2002325115 A | 11/2002 | |
| JP | 2006295554 A | 10/2006 | |
| JP | 2006303565 A | 11/2006 | |
| JP | 2009171302 A | 7/2009 | |
| JP | 2009206868 A | 9/2009 | |
| JP | 2009290304 A | 12/2009 | |

OTHER PUBLICATIONS

Second office action issued in corresponding Chinese patent application No. 201010188549.X, dated Nov. 5, 2012, and English translation thereof, total 7 pages.

International search report issued in corresponding PCT application No. PCT/CN2011/074939, dated Sep. 1, 2011, total 3 pages.

Third office action issued in corresponding Chinese patent application 201010188549.X, dated May 9, 2013, and English translation thereof, total 8 pages.

Search report issued in corresponding European patent application No. 11789193.7, dated May 21, 2013, total 7 pages.

* cited by examiner

INFORMATION PROCESSING METHOD AND USER EQUIPMENT

CROSS-REFERENCE TO RELATED APPLICATIONS

This application is a continuation of International Application PCT/CN2011/074939, filed on May 31, 2011, which claims priority to Chinese Patent Application No. 201010188549.X, filed on May 31, 2010, both of which are hereby incorporated by reference in their entireties.

FIELD OF THE INVENTION

The present invention relates to the field of communications, and in particular, to an apparatus and method for processing an information processing request in a mobile device.

BACKGROUND OF THE INVENTION

Because of its characteristics such as mobility and ease of use, a mobile device such as a mobile phone is widely used by users.

At present, when a new event such as an incoming call, an incoming message or a schedule occurs on a mobile phone, the mobile phone usually makes the user perceive the new event through a mobile phone ring or vibration. When the user is walking and the surrounding environment is very noisy, if the mobile phone receives a new event at this moment, the user may be unable to perceive the ring or vibration triggered by the mobile phone, and thus the new event received by the mobile phone may not be processed in time. Even when the user walks to a quiet place or stands still, if the user does not watch the mobile phone, the user will not perceive such new events that are not processed in time. Additionally, when coming back home, the user usually puts the mobile phone in a place such as the bedroom, and then goes to the living room to watch TV. If a new event occurs on the mobile phone at this moment, the user may be unable to perceive the ring or vibration triggered by the mobile phone. Moreover, when returning to the bedroom, if the user does not watch the mobile phone, the user still cannot perceive the new events that are not processed in time.

During the implementation of the present invention, the inventors find that a user is often unable to process in time the new event received by the mobile phone and thus considerable inconvenience is brought to the user.

SUMMARY OF THE INVENTION

Embodiments of the present invention provide an apparatus and method for processing an information processing request in a mobile device.

One embodiment of the present invention provides an information processing method in a mobile device, including: receiving an information processing request message; collecting at least one type of environmental state information associated with the mobile device if the information processing request message is not processed by the mobile device within a first predetermined time; and generating prompting information according to the collected environmental state information, wherein the prompting information is used to prompt a user to process the unprocessed information processing request message.

Another embodiment of the present invention provides a mobile device, including: a receiving module configured to receive an information processing request message; a first collecting module configured to collect at least one type of environmental state information associated with the mobile device if the information processing request message is not processed by the mobile device within a first predetermined time; and a first generating module configured to generate prompting information according to the collected environmental state information, wherein the prompting information is used to prompt a user to process the unprocessed information processing request message.

Therefore, the user can be made to timely perceive the information processing request message that has been received but not processed by the mobile device in time, thus effectively improving the usability of the mobile device.

DETAILED DESCRIPTION OF THE EMBODIMENTS

Figure 1:
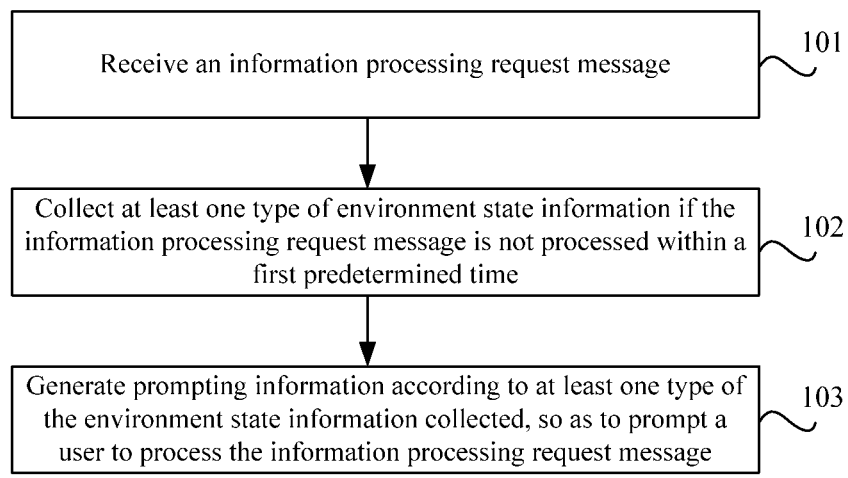
FIG. 1 is a flowchart of the information processing method according to an embodiment of the invention.

FIG. 1 is a flowchart of an information processing method according to an embodiment of the invention. As shown in FIG. 1, the method according to this embodiment includes:

Step 101: Receive an information processing request message.

In this embodiment, a user equipment receives an information processing request message, wherein the information processing request message may be a call, a short message or a schedule, etc. The user equipment may be a mobile phone, etc.

Step 102: Collect at least one type of environment state information if the information processing request message is not processed within a first predetermined time.

In this embodiment, when the user equipment receives an information processing request message, if the user does not process the information processing request message through the user equipment within a first predetermined time, the user equipment is triggered to collect at least one type of environment state information, wherein the environment state information may be the information obtained by collecting the movement of the user equipment, the sound in the environment and/or the light in the environment of the user equipment, etc. In this embodiment, the first predetermined time may be set according to a requirement of the user.

Step 103: Generate prompting information according to the collected environment state information, so as to prompt the user to process the information processing request message.

In this embodiment, the prompting information may be a special ring and/or vibration. The user equipment generates the special ring and/or vibration according to the collected environment state information, so as to prompt the user to process the information processing request message. In this embodiment, the specific mode in which the user equipment prompts the user is not limited.

In this embodiment, if the information processing request message received by the user equipment is not processed within the first predetermined time, at least one type of environment state information is collected, and the prompting information is generated according to the collected environment state information, so as to prompt the user to process the information processing request message, and thus the user equipment may generate the prompting information according to an identified environment state in which the user equipment is, so as to prompt the user to process the information processing request message, thereby the user can perceive in time the information processing request message that has been received by the user equipment but not processed in time. Thus, the usability of the user equipment is effectively improved.

Moreover, in another embodiment of the information processing method, step 103 may be specifically the following:

generating the prompting information if at least one type of collected environment state information meets a preset condition, wherein the environment state information includes one or any combination of the following information: the first gravity sensing information, the first sound sensing information and the first light sensing information, and the preset condition includes at least one type of the following conditions: the first gravity sensing information is smaller than a preset vibration amplitude, the first sound sensing information is smaller than a preset decibel, and the first light sensing information is greater than a preset light intensity.

Specifically, the preset condition may be the following seven preset conditions:

First preset condition: the first gravity sensing information is smaller than a preset vibration amplitude.

Under this preset condition, when one type of environment state information collected by the user equipment is the first gravity sensing information, if the first gravity sensing information meets the first preset condition, it indicates that the user equipment is in a still state currently, so that the user equipment is triggered to generate the prompting information. For example, when the user is running, the user may be unable to perceive the vibration triggered by the user equipment according to the received information processing request message. When the user stops to rest, the first gravity sensing information collected by the user equipment meets the first preset condition, so that the user equipment is triggered to generate the prompting information.

Second preset condition: the first sound sensing information is smaller than a preset decibel.

Under this preset condition, when one type of environment state information collected by the user equipment is the first sound sensing information, if the first sound sensing information meets the second preset condition, it indicates that the user equipment is in a quiet environment currently, so that the user equipment is triggered to generate the prompting information. For example, if the working environment of the user is noisy, when the user works under this environment, the user may be unable to perceive the ring triggered by the user equipment according to the received information processing request message. When the user walks out of this working environment and enters a quiet sound environment, the first sound sensing information collected by the user equipment meets the second preset condition, so that the user equipment is triggered to generate the prompting information.

Third preset condition: the first light sensing information is greater than a preset light intensity.

Under this preset condition, when one type of environment state information collected by the user equipment is the first light sensing information, if the first light sensing information meets the third preset condition, it indicates that the user equipment is in a bright environment currently, so that the user equipment is triggered to generate the prompting information. For example, the user is used to put the user equipment in a bag, so the user may be unable to perceive the vibration triggered by the user equipment according to the received information processing request message. When the user opens the bag to take out something, light enters the bag, and at this moment, the first light sensing information collected by the user equipment meets the third preset condition, so that the user equipment is triggered to generate the prompting information.

Fourth preset condition: the first gravity sensing information is smaller than a preset vibration amplitude, and the first sound sensing information is smaller than a preset decibel.

Under this preset condition, when the two types of environment state information collected by the user equipment are the first gravity sensing information and the first sound sensing information, if the first gravity sensing information and the first sound sensing information meet the fourth preset condition, it indicates that the user equipment is in a still state and the user equipment is in a quiet environment currently, so that the user equipment is triggered to generate the prompting information. For example, when the user walks in a place under a noisy environment, the user may be unable to perceive the ring and/or vibration triggered by the user equipment according to the received information processing request message. When the user rests under a quiet environment, the first gravity sensing information and the first sound sensing information collected by the user equipment meet the fourth preset condition, so that the user equipment is triggered to generate the prompting information.

Fifth preset condition: the first gravity sensing information is smaller than a preset vibration amplitude, and the first light sensing information is greater than a preset light intensity;

Under this preset condition, when the two types of environment state information collected by the user equipment are the first gravity sensing information and the first light sensing information, if the first gravity sensing information and the first light sensing information meet the fifth preset condition, it indicates that the user equipment is in a still state and the user equipment is in a bright environment currently, so that the user equipment is triggered to generate the prompting information. For example, when the user walks and puts the user equipment in a bag, the user may be unable to perceive the vibration triggered by the user equipment according to the received information processing request message. When the user stops to take out something from the bag, light enters the bag, the first gravity sensing information and the first light sensing information collected by the user equipment meet the fifth preset condition, so that the user equipment is triggered to generate the prompting information.

Sixth preset condition: the first sound sensing information is smaller than a preset decibel, and the first light sensing information is greater than a preset light intensity;

Under this preset condition, when the two types of environment state information collected by the user equipment are the first sound sensing information and the first light sensing information, if the first sound sensing information and the first light sensing information meet the sixth preset condition, it indicates that the user equipment is in a quiet and bright environment currently, so that the user equipment is triggered to generate the prompting information. For example, when the user puts the mobile phone in a bag and stays in a place under a noisy environment, the user may be unable to perceive the ring and/or vibration triggered by the user equipment according to the received information processing request message. When the user opens the bag to take out something under a quiet environment, light enters the bag, the first sound sensing information and the first light sensing information collected by the user equipment meet the sixth preset condition, so that the user equipment is triggered to generate the prompting information.

Seventh preset condition: the first gravity sensing information is smaller than a preset vibration amplitude, the first sound sensing information is smaller than a preset decibel, and the first light sensing information is greater than a preset light intensity.

Under this preset condition, when the three types of environment state information collected by the user equipment are the first gravity sensing information, the first sound sensing information and the first light sensing information, it indicates that the user equipment is in a still state and the user equipment is in a quiet and bright environment currently, so that the user equipment is triggered to generate the prompting information. For example, when the user puts the mobile phone in a bag and walks in a place under a noisy environment, the user may be unable to perceive the ring and/or vibration triggered by the user equipment according to the received information processing request message. When the user stops under a quiet environment and opens the bag to take out something, light enters the bag, the first gravity sensing information, the first sound sensing information and the first light sensing information collected by the user equipment meet the seventh preset condition, so that the user equipment is triggered to generate the prompting information.

In this embodiment, the first gravity sensing information may be the information obtained by the user equipment by collecting the movement status of the user equipment itself. The first sound sensing information may be the information obtained by the user equipment by collecting the sound of the environment in which the user equipment exists. The first light sensing information may be the information obtained by the user equipment by collecting the light of the environment in which the user equipment exists.

It should be noted that in the embodiment, the content of the preset conditions is not limited, and the preset conditions are not limited to the foregoing mentioned conditions. One skilled in the art may arbitrarily set the content of the preset conditions according to the requirements of the environment, etc.

Moreover, in another embodiment of the information processing method, the method may further include:

continuing to collect the environment state information if the collected environment state information fails to meet the preset condition.

Specifically, when the three types of environment state information collected by the user equipment are the first gravity sensing information, the first sound sensing information and the first light sensing information, and such three types of environment state information fail to meet the seventh preset condition, for example, the first gravity sensing information is greater than the preset vibration amplitude, the first sound sensing information is greater than the preset decibel, and the first light sensing information is greater than the preset light intensity, then the user equipment may continue to collect these three types of environment state information.

Alternatively, the method may further include:

continuing to collect a part of the environment state information if the collected environment state information fails to meet the preset condition. The part of the environment state information includes: all the environment state information which fails to meet the preset condition in the environment state information; or a part of the environment state information which fails to meet the preset condition in the environment state information; or a part of environment state information selected from the environment state information.

Specifically, there may be the following several modes for implementing the step of continuing to collect a part of the environment state information if the collected environment state information fails to meet the preset condition:

First implementing mode: when the three types of environment state information collected by the user equipment are the first gravity sensing information, the first sound sensing information and the first light sensing information, and such three types of environment state information fail to meet the seventh preset condition, for example, the user walks in a place under a noisy and bright environment, that is, the first gravity sensing information is greater than the preset vibration amplitude, the first sound sensing information is greater than the preset decibel, and the first light sensing information is greater than the preset light intensity, the user may be unable to perceive the ring and/or vibration triggered by the user equipment according to the received information processing request message, then the user equipment may continue to collect the first gravity sensing information and the first sound sensing information. When the user stops to rest under a quiet environment, the first gravity sensing information collected by the user equipment is smaller than the preset vibration amplitude and the first sound sensing information is smaller than the preset decibel, at this moment, the user may perceive the ring and/or vibration triggered by the user equipment according to the received information processing request message, so that the user equipment generates the prompting information to remind the user of the information processing request message that is not processed in time.

Second implementing mode: when the three types of environment state information collected by the user equipment are the first gravity sensing information, the first sound sensing information and the first light sensing information, and such three types of environment state information fail to meet the seventh preset condition, for example, the user walks in a place under a noisy and bright environment, that is, the first gravity sensing information is greater than the preset vibration amplitude, the first sound sensing information is greater than the preset decibel, and the first light sensing information is greater than the preset light intensity, the user may be unable to perceive the ring and/or vibration triggered by the user equipment according to the received information processing request message, then the user equipment may continue to collect the first gravity sensing information. When the user stops to rest, the first gravity sensing information collected by the user equipment is smaller than the preset vibration amplitude, at this moment, the user may perceive the vibration triggered by the user equipment according to the received information processing request message, so that the user equipment generates the prompting information to remind the user of the information processing request message that is not processed in time.

Third implementing mode: when the three types of environment state information collected by the user equipment are the first gravity sensing information, the first sound sensing information and the first light sensing information, and such three types of environment state information fail to meet the seventh preset condition, for example, the user puts the user equipment in a bag and then puts the bag on a table, and the user equipment is in a noisy environment, that is, the first gravity sensing information is smaller than the preset vibration amplitude, the first sound sensing information is greater than the preset decibel, and the first light sensing information is smaller than the preset light intensity, the user may be unable to perceive the ring and/or vibration triggered by the user equipment according to the received information processing request message, then the user equipment may continue to collect the first gravity sensing information and the first light sensing information. When the user takes up the bag from the table and takes out something from the bag, the first gravity sensing information collected by the user equipment is greater than the preset vibration amplitude, and the first light sensing information is greater than the preset light intensity, at this moment, the user may perceive the ring triggered by the user equipment according to the received information processing request message, so that the user equipment generates the prompting information to remind the user of the information processing request message that is not processed in time.

It should be noted that in this embodiment, when the collected environment state information fails to meet the preset condition, the environment state information or the part of the environment state information that the user equipment continues to collect is not limited, and one skilled in the art may arbitrarily collect the environment state information according to the requirements of the environment, etc.

Figure 2:
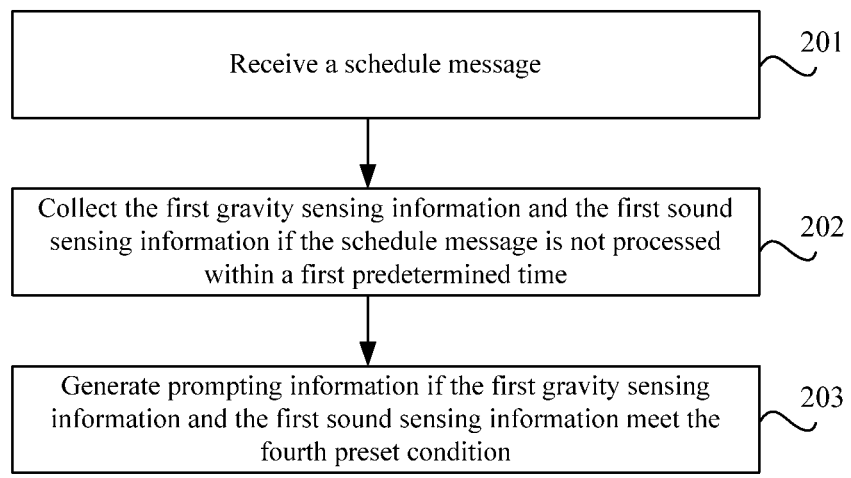
FIG. 2 is a flowchart of the information processing method according to another embodiment of the invention.

FIG. 2 is a flowchart of the information processing method according to another embodiment of the invention. As shown in FIG. 2, in this embodiment, the technical solution of the embodiment is described in detail by using an example in which the two types of environment state information collected by the user equipment are the first gravity sensing information and the first sound sensing information and the preset condition is the fourth preset condition. The method according to this embodiment includes:

Step 201: Receive a schedule message.

In this embodiment, the implementing mode of step 201 is similar to that of step 101 shown in FIG. 1, so it is not described again here.

Step 202: Collect the first gravity sensing information and the first sound sensing information if the schedule message is not processed within a first predetermined time.

In this embodiment, for example, the user equipment is a mobile phone, and the user of the user equipment is on the way to a bus station on foot, the mobile phone receives a schedule message and reminds the user through a ring and/or vibration triggered by the mobile phone. However, because the user is walking and the surrounding environment is very noisy, the user does not perceive the ring and/or vibration triggered by the mobile phone according to the received schedule message. Within the first predetermined time, the mobile phone identifies that the schedule message has not been processed by the user, so that the mobile phone is triggered to collect the first gravity sensing information and the first sound sensing information.

Step 203: Generate the prompting information if the first gravity sensing information and the first sound sensing information meet the fourth preset condition.

In this embodiment, when the user comes back home or is in an elevator, the mobile phone is in a still state at this moment and the surrounding environment is very quiet, so that the mobile phone identifies that the first gravity sensing information is smaller than the preset vibration amplitude and the first sound sensing information is smaller than the preset decibel, thereby the mobile phone identifies that under the current environment of the mobile phone, the user may perceive the ring and/or vibration prompt triggered by the mobile phone. Therefore, the mobile phone generates a special ring and/or vibration to prompt the user that there exists a schedule message that is not processed in time.

It should be noted that, when the user walks on his way and the surrounding environment is very noisy, the mobile phone identifies that the first gravity sensing information and the first sound sensing information fail to meet the fourth preset condition, for example, the first gravity sensing information is greater than the preset vibration amplitude and the first sound sensing information is greater than the preset decibel, so that the mobile phone identifies that under the current environment of the mobile phone, the user is unable to perceive the ring and/or vibration prompt triggered by the mobile phone. Therefore, the mobile phone does not generate a special ring and/or vibration prompt at this moment. Then, the method may further include:

continuing to collect the first gravity sensing information and the first sound sensing information if the first gravity sensing information and the first sound sensing information fail to meet the fourth preset condition.

Alternatively, the method may further include:

continuing to collect the first gravity sensing information or the first sound sensing information if the first gravity sensing information and the first sound sensing information fail to meet the fourth preset condition.

Specifically, if the first gravity sensing information and the first sound sensing information fail to meet the fourth preset condition, the mobile phone may further continue to collect the first gravity sensing information; if the collected first gravity sensing information is smaller than the preset vibration amplitude, the mobile phone generates the prompting information. For example, when the user stops to rest under a noisy environment, at this moment, the first gravity sensing information collected by the mobile phone is smaller than the preset vibration amplitude, then the mobile phone identifies that the mobile phone is in a still environment currently and the user may perceive the vibration triggered by the mobile phone, and thus the mobile phone generates the prompting information to prompt the user that there exists a schedule message that is not processed in time.

More specifically, if the first gravity sensing information and the first sound sensing information fail to meet the fourth preset condition, the mobile phone may further continue to collect the first sound sensing information, if the collected first sound sensing information is smaller than the preset decibel, the mobile phone generates the prompting information. For example, when the user walks from a noisy environment into a quiet environment, at this moment, the first sound sensing information collected by the mobile phone is smaller than the preset decibel, then the mobile phone identifies that the mobile phone is in a quiet environment and the user may perceive the ring triggered by the mobile phone, and thus the mobile phone generates the prompting information to prompt the user that there exists a schedule message that is not processed in time.

In this embodiment, if the information processing request message received by the user equipment is not processed within a first predetermined time, the user equipment collects the first gravity sensing information and the first sound sensing information. If the first gravity sensing information and the first sound sensing information meet the fourth preset condition, the user equipment generates the prompting information according to the first gravity sensing information and the first sound sensing information, so that the user equipment identifies whether the user may perceive the prompting information generated by the user equipment according to the movement status of the user equipment itself and the sound in the environment in which the user equipment exists, thereby in the case that the user can perceive the prompting information generated by the user equipment, the user equipment is triggered to generate the prompting information to prompt the user to process the information processing request message. Thus, the user can be effectively made to in time perceive the information processing request message that has been received by the user equipment but not processed in time, and the usability of the user equipment can be effectively improved.

Figure 3:
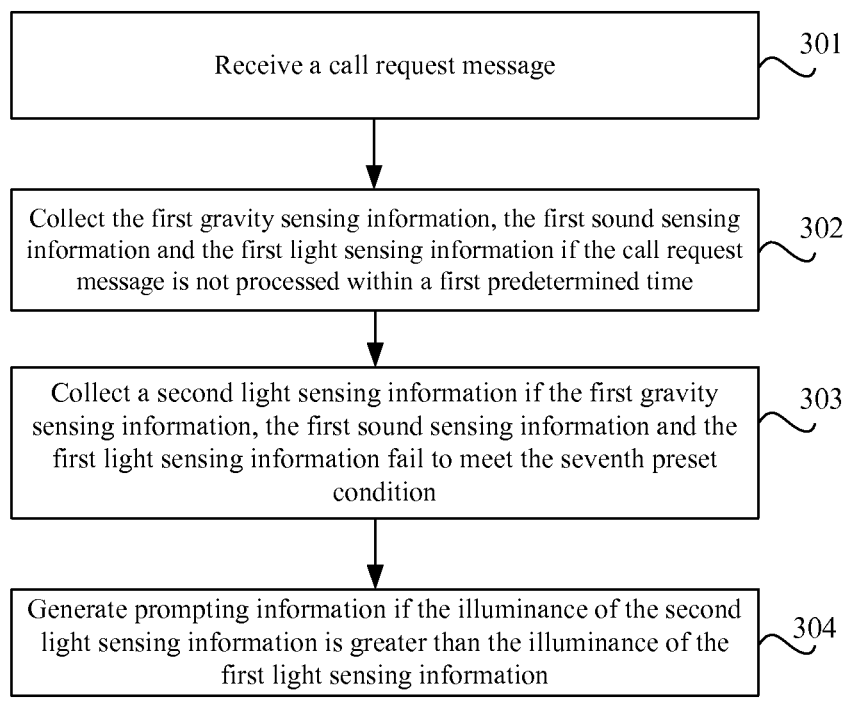
FIG. 3 is a flowchart of the information processing method according to yet another embodiment of the invention.

FIG. 3 is a flowchart of the information processing method according to yet another embodiment of the invention. As shown in FIG. 3, in this embodiment, the technical solution of the embodiment is described in detail by using an example in which the three types of environment state information collected by the user equipment are the first gravity sensing information, the first sound sensing information and the first light sensing information, and the preset condition is the seventh preset condition. The method of this embodiment includes:

Step 301: Receive a call request message.

In this embodiment, the implementing mode of step 301 is similar to that of step 101 shown in FIG. 1, so it is not described again here.

Step 302: Collect the first gravity sensing information, the first sound sensing information and the first light sensing information if the call request message is not processed within a first predetermined time.

In this embodiment, a user puts the mobile phone in the bedroom and then goes to watch TV in the living room. Because the volume of the TV program is high, when the mobile phone receives a call request, the user that is watching TV in the living room does not perceive the ring and/or vibration triggered by the mobile phone. Moreover, the call request message is not processed within the first predetermined time, that is, the mobile phone identifies that the user does not in time process the call request message, so that the mobile phone is triggered to collect the first gravity sensing information, the first sound sensing information and the first light sensing information.

Step 303: Collect second light sensing information if the first gravity sensing information, the first sound sensing information and the first light sensing information fail to meet the seventh preset condition.

In this embodiment, because the first gravity sensing information, the first sound sensing information and the first light sensing information fail to meet the seventh preset condition, the mobile phone identifies that under the current environment, the user cannot perceive the ring and/or vibration triggered by the mobile phone, at this moment, the mobile phone may detect, in real time, the light environment in which the mobile phone exists, that is, the mobile phone may collect the second light sensing information in real time. In this embodiment, the mobile phone may identify, according to the first gravity sensing information, the first sound sensing information and the collected first light sensing information, that the current environment of the mobile phone is noisy and the light environment is dim.

Step 304: Generate the prompting information if the light intensity of the second light sensing information is greater than the light intensity of the first light sensing information.

In this embodiment, when the user returns to the bedroom for something and turns on the light in the bedroom, at this moment, the light intensity of the second light sensing information collected by the mobile phone is greater than the light intensity of the first light sensing information, that is, the mobile phone identifies that at this moment, the light environment in which the mobile phone exists changes from dim to bright, so that the mobile phone identifies that the user may perceive the ring and/or vibration triggered by the mobile phone, thereby the mobile phone is triggered to cause a special ring and/or vibration to prompt the user of the call request message in the mobile phone that is not processed in time.

In this embodiment, if the information processing request message received by the user equipment is not processed within the first predetermined time, the user equipment collects the first gravity sensing information, the first sound sensing information and the first light sensing information. If the first gravity sensing information, the first sound sensing information and the first light sensing information fail to meet the seventh preset condition, the user equipment collects the second light sensing information in real time. If the light intensity of the second light sensing information is greater than the light intensity of the first light sensing information, the user equipment generates the prompting information, so that the mobile phone can be triggered to generate the prompting information according to the movement status of the mobile phone itself, the change of the light and the sound in the environment in which the mobile phone exists, thereby the user can in time perceive the information processing request message that has been received by the user equipment but not processed in time, and therefore, the usability of the user equipment may also be effectively improved.

Figure 4:
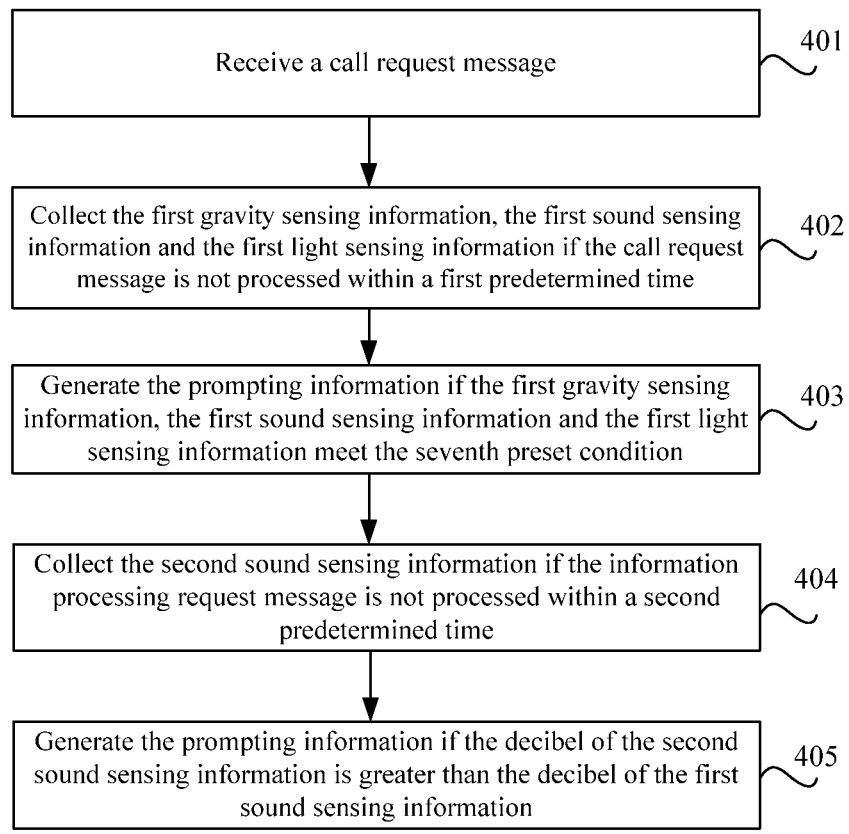
FIG. 4 is a flowchart of the information processing method according to still another embodiment of the invention.

FIG. 4 is a flowchart of the information processing method according to still another embodiment of the invention. As shown in FIG. 4, in this embodiment, the technical solution of the embodiment is described in detail by using an example in which the three types of environment state information collected by the user equipment are the first gravity sensing information, the first sound sensing information and the first light sensing information, and the preset condition is the seventh preset condition. The method of this embodiment includes:

Step 401: Receive a call request message.

In this embodiment, the implementing mode of step 401 is similar to that of step 101 shown in FIG. 1, so it is not described again here.

Step 402: Collect the first gravity sensing information, the first sound sensing information and the first light sensing information if the call request message is not processed within a first predetermined time.

In this embodiment, when coming back home, a user puts the mobile phone in the bedroom and then goes to another room. When the mobile phone receives a call request message, because the user is in another room, the user does not perceive the ring and/or vibration triggered by the mobile phone due to the received call request message, and the user does not process the call request message received by the mobile phone within the first predetermined time, and thus the mobile phone identifies that the user does not in time process the call request message, so that the mobile phone is triggered to collect the first gravity sensing information, the first sound sensing information and the first light sensing information.

Step 403: Generate the prompting information if the first gravity sensing information, the first sound sensing information and the first light sensing information meet the seventh preset condition.

In this embodiment, when the mobile phone identifies that the first gravity sensing information is smaller than the preset vibration amplitude, the first sound sensing information is smaller than the preset decibel and the first light sensing information is greater than the preset light intensity, the mobile phone identifies that the sound environment in which the mobile phone exists is very quiet and the light environment is very bright, so that the mobile phone identifies that the user can perceive the special ring and/or vibration triggered by the mobile phone, thereby the mobile phone is triggered to trigger a special ring and/or vibration.

Step 404: Collect second sound sensing information if the information processing request message is not processed within a second predetermined time.

In this embodiment, after the mobile phone generates the prompting information, the user does not process the received information processing request message within the second predetermined time, then the mobile phone identifies that the user may not be at the side of the mobile phone, so that the mobile phone is triggered to store the first gravity sensing information, the first sound sensing information and the first light sensing information. It should be noted that the second predetermined time may be equal to the first predetermined time, or may be smaller than the first predetermined time. In this embodiment, it is preferred that the second predetermined time is smaller than the first predetermined time, for example, the first predetermined time may be 5 minutes, and the second predetermined time may be 1 minute. In this embodiment, after the mobile phone generates the prompting information, if the user does not process the received information processing request message within the second predetermined time, the mobile phone identifies that the user may not be at the side of the mobile phone, so that the mobile phone is triggered to collect the second sound sensing information.

Step 405: Generate the prompting information if the decibel of the second sound sensing information is greater than the decibel of the first sound sensing information.

In this embodiment, the user returns to the bedroom from another room, and a sound is generated in the bedroom due to activities such as walking or speaking, etc., so that the decibel of the second sound sensing information collected by the mobile phone is greater than the decibel of the first sound sensing information, thereby the mobile phone identifies that the user may be around the mobile phone and may perceive the special ring and/or vibration triggered by the mobile phone. Thus, the mobile phone is triggered to trigger a special ring and/or vibration to prompt the user of the call request message received by the mobile phone which is not processed in time.

In this embodiment, if the received information processing request message is not processed within the first predetermined time, the user equipment collects the first gravity sensing information, the first sound sensing information and the first light sensing information. If the first gravity sensing information, the first sound sensing information and the first light sensing information meet the seventh preset condition, the user equipment generates the prompting information to prompt the user of the information processing request message that is not processed in time. If the user does not process the information processing request message within the second predetermined time, the user equipment identifies that the user may not be in the vicinity of the mobile phone, thereby the user equipment is triggered to collect the second sound sensing information. If the decibel of the second sound sensing information is greater than the decibel of the first sound sensing information, the user equipment generates the prompting information again, so that the user equipment can identify, according to the change of environment, whether the user equipment needs to prompt the user of the information processing request message received by the user equipment which is not processed in time, and the user can in time perceive the information processing request message that has been received by the user equipment but not processed in time, and therefore, the usability of the user equipment may also be effectively improved.

Figure 5:
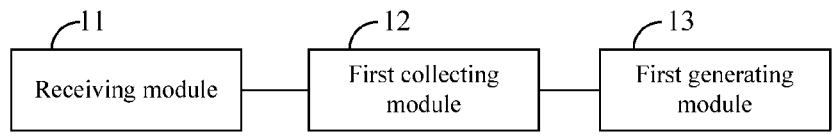
FIG. 5 is a structural schematic diagram of the user equipment according to an embodiment of the invention.

FIG. 5 is a structural schematic diagram of the user equipment according to an embodiment of the invention. As shown in FIG. 5, the user equipment of this embodiment includes: a receiving module 11, a first collecting module 12 and a first generating module 13. The receiving module 11 is configured to receive an information processing request message; the first collecting module 12 is configured to collect at least one type of environment state information if the information processing request message is not processed within a first predetermined time; and the first generating module 13 is configured to generate the prompting information according to the collected environment state information, so as to prompt a user to process the information processing request message.

The user equipment according to this embodiment may be configured to perform the technical solution of the method embodiment shown in FIG. 1. The implementing principle thereof is similar, so it is not described again here.

In this embodiment, if the received information processing request message is not processed within the first predetermined time, at least one type of environment state information is collected, and the prompting information is generated according to the collected environment state information, so as to prompt the user to process the information processing request message, so that the user equipment may generate, according to the environment identified under which the user equipment exists, the prompting information to prompt the user of the information processing request message, thereby the user can perceive in time the information processing request message that has been received by the user equipment but not processed in time, and thus the usability of the user equipment may be effectively improved.

Moreover, the first generating module 13 is specifically configured to generate the prompting information if the collected environment state information meets a preset condition, wherein the environment state information includes one or any combination of the following information: the first gravity sensing information, the first sound sensing information and the first light sensing information, and the preset condition includes at least one type of the following conditions: the first gravity sensing information is smaller than the preset vibration amplitude, the first sound sensing information is smaller than the preset decibel, and the first light sensing information is greater than the preset light intensity.

Figure 6:
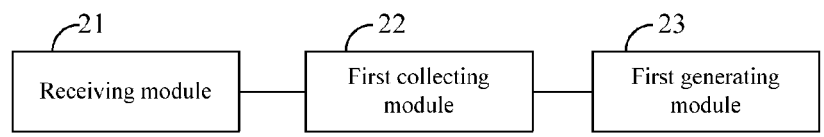
FIG. 6 is a structural schematic diagram of the user equipment according to another embodiment of the invention.

FIG. 6 is a structural schematic diagram of the user equipment according to another embodiment of the invention. As shown in FIG. 6, the mobile terminal communication equipment includes: a receiving module 21, a first collecting module 22 and a first generating module 23. The receiving module 21 is configured to receive an information processing request message; the first collecting module 22 is configured to collect at least one type of environment state information if the information processing request message is not processed within a first predetermined time; and the first generating module 23 is configured to generate prompting information if the collected environment state information meets a preset condition. The first collecting module 22 is further configured to continue to collect the environment state information if the collected environment state information fails to meet the preset condition.

Moreover, the first collecting module 22 may be further configured to continue to collect a part of the environment state information if the collected environment state information fails to meet the preset condition, where the part of the environment state information includes: all the environment state information which fails to meet the preset condition in the environment state information; or a part of the environment state information which fails to meet the preset condition in the environment state information; or a part of the environment state information selected from the environment state information.

The user equipment of this embodiment may be configured to perform the technical solution of the method embodiment shown in FIG. 2. The implementing principle thereof is similar, so it is not described again here.

In this embodiment, if the received information processing request message is not processed within the first predetermined time, the user equipment collects the first gravity sensing information and the first sound sensing information. If the first gravity sensing information and the first sound sensing information meet the fourth preset condition, the user equipment generates the prompting information according to the first gravity sensing information and the first sound sensing information, so that the user equipment identifies whether the user may perceive the prompting information generated by the user equipment according to the movement status of the user equipment itself and the sound in the environment in which the user equipment exists. Thereby in the case that the user can perceive the prompting information generated by the user equipment, the user equipment is triggered to generate the prompting information to prompt the user to process the information processing request message, and thus the user can be effectively made to in time perceive the information processing request message that has been received by the user equipment but not processed in time, and the usability of the user equipment can be effectively improved.

Figure 7:
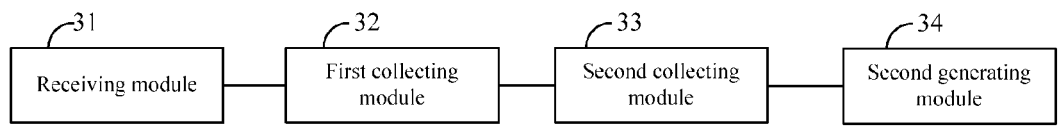
FIG. 7 is a structural representation of the user equipment according to yet another embodiment of the invention.

FIG. 7 is a structural schematic diagram of the user equipment according to yet another embodiment of the invention. As shown in FIG. 7, the mobile terminal communication equipment includes: a receiving module 31, a first collecting module 32, a second collecting module 33 and a second generating module 34. The receiving module 31 is configured to receive an information processing request message; the first collecting module 32 is configured to collect the first gravity sensing information, the first sound sensing information and the first light sensing information if the information processing request message is not processed within a first predetermined time; the second collecting module 33 is configured to collect the second light sensing information if the collected environment state information fails to meet a preset condition; the second generating module 34 is configured to generate the prompting information if the light intensity of the second light sensing information is greater than the light intensity of the first light sensing information.

The user equipment of this embodiment may be configured to perform the technical solution of the method embodiment shown in FIG. 3. The implementing principle thereof is similar, so it is not described again here.

In this embodiment, if the received information processing request message is not processed within the first predetermined time, the user equipment collects the first gravity sensing information, the first sound sensing information and the first light sensing information. If the first gravity sensing information, the first sound sensing information and the first light sensing information fail to meet the seventh preset condition, the user equipment collects the second light sensing information in real time. When the light intensity of the second light sensing information is greater than the light intensity of the first light sensing information, the user equipment generates the prompting information, so that the mobile phone can be triggered to generate the prompting information according to the movement status of the mobile phone itself, the change of the light and the sound in the environment in which the mobile phone exists, thereby the user can in time perceive the information processing request message that has been received by the user equipment but not processed in time. Therefore, the usability of the user equipment may also be effectively improved.

Figure 8:
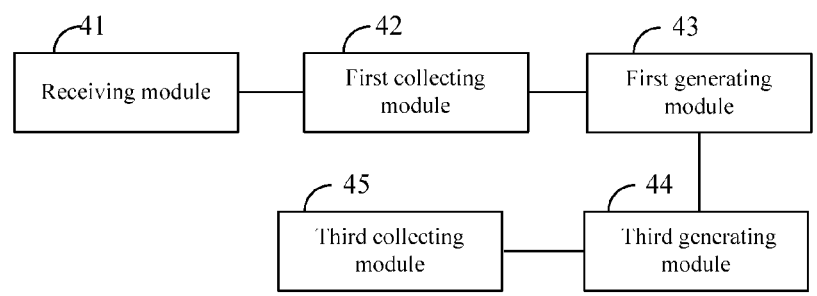
FIG. 8 is a structural schematic diagram of the user equipment according to still another embodiment of the invention.

FIG. 8 is a structural schematic diagram of the user equipment according to still another embodiment of the invention. As shown in FIG. 8, the mobile terminal communication equipment includes: a receiving module 41, a first collecting module 42, a first generating module 43, a third collecting module 44 and a third generating module 45. The receiving module 41 is configured to receive an information processing request message; the first collecting module 42 is configured to collect the first gravity sensing information, the first sound sensing information and the first light sensing information if the information processing request message is not processed within a first predetermined time; the first generating module 43 is configured to generate the prompting information if the collected environment state information meets a preset condition, wherein the environment state information includes the first gravity sensing information, the first sound sensing information or the first light sensing information, and the preset condition includes at least one type of the following conditions: the first gravity sensing information is smaller than a preset vibration amplitude, the first sound sensing information is smaller than a preset decibel, and the first light sensing information is greater than a preset light intensity. The third collecting module 44 is configured to collect the second sound sensing information if the information processing request message is not processed within a second predetermined time. The third generating module 45 is configured to generate the prompting information if the decibel of the second sound sensing information is greater than the decibel of the first sound sensing information.

The user equipment of this embodiment may be configured to perform the technical solution of the method embodiment shown in FIG. 4. The implementing principle thereof is similar, so it is not described again here.

In this embodiment, if the received information processing request message is not processed within the first predetermined time, the user equipment collects the first gravity sensing information, the first sound sensing information and the first light sensing information. If the first gravity sensing information, the first sound sensing information and the first light sensing information meet the seventh preset condition, the user equipment generates the prompting information to prompt the user of the information processing request message that has been received by the user equipment but not processed in time. If the user does not process the information processing request message within the second predetermined time, the user equipment identifies that the user may not be in the vicinity of the mobile phone, thereby the user equipment is triggered to collect the second sound sensing information. When the decibel of the second sound sensing information is greater than the decibel of the first sound sensing information, the user equipment generates the prompting information again, so that the user equipment can identify, according to the change of environment, whether the user equipment needs to prompt the user to perceive the information processing request message that has been perceived by the user equipment but not processed in time, and the user can in time perceive the information processing request message that has been received by the user equipment but not processed in time. Therefore, the usability of the user equipment may also be effectively improved.

One of ordinary skills in the art may understand that, all or a part of the steps for implementing the foregoing method embodiment may be accomplished by program instruction-related hardware, and the foregoing program may be stored in a computer-readable storage medium. When executed, the program may perform the steps included in the foregoing method embodiment. The foregoing storage medium includes various media that can store program codes, such as ROM, RAM, diskette or compact disc.

The preceding embodiments are exemplary embodiments of the present invention only and not intended to limit the protection scope of the invention. It is apparent that various modifications and variations may be made to these embodiments without departing from the scope of the invention. The invention is intended to cover such modifications and variations provided that they fall in the scope of protection defined by the following claims.

What is claimed is:

1. An information processing method used for a mobile device, wherein the method comprises:
   receiving an information processing request message;
   collecting values of first and second environmental state parameters associated with the mobile device if the information processing request message is not processed by the mobile device within a first predetermined time;
   if the value of first environmental state parameter meets a preset condition and the value of second environmental state parameter fails to meet a preset condition, continuing to collect the value of second environmental state parameter; and
   if the values of first and second environmental state parameters meet the preset conditions, generating prompting information, wherein the prompting information is used to prompt a user to process the unprocessed information processing request message.

2. The information processing method according to claim 1, the information processing request message comprises a call, a short message or a schedule.

3. The information processing method according to claim 1, the first or second environmental state parameter comprises at least one of following parameter: a gravity sensing parameter, a sound sensing parameter, and a light sensing parameter.

4. The information processing method according to claim 3, the preset condition comprises at least one of the following conditions: the gravity sensing parameter is smaller than a preset vibration amplitude, the sound sensing parameter is smaller than a preset decibel, and the flight sensing parameter is greater than a preset light intensity.

5. The information processing method according to claim 3, the preset condition comprises at least one of the following conditions: the gravity sensing parameter is greater than a preset vibration amplitude, the sound sensing parameter is greater than a preset decibel, and the flight sensing parameter is smaller than a preset light intensity.

6. The information processing method according to claim 1, the first and second environmental state parameters are of two different types.

7. A mobile device, comprises:
   at least one senor;
   a memory for storing computer instructions;
   a processor configured to execute the computer instructions to perform operations of:
   receiving an information processing request message;
   collecting values of first and second environmental state parameters associated with the mobile device if the information processing request message is not processed by the mobile device within a first predetermined time;
   if the value of first environmental state parameter meets a preset condition and the values of second environmental state parameter fails to meet a preset condition, continuing to collect the value of second environmental state parameter; and
   if the values of first and second environmental state parameters meet the preset conditions, generating prompting information, wherein the prompting information is used to prompt a user to process the unprocessed information processing request message.

8. The mobile device according to claim 7, the first and second environmental state parameters are of two different types.

9. The mobile device according to claim 7, the first or second environmental state parameter comprises at least one of following parameter: a gravity sensing parameter, a sound sensing parameter or a light sensing parameter.

10. The mobile device according to claim 9, the preset condition comprises at least one of the following conditions: the gravity sensing parameter is smaller than a preset vibration amplitude, the sound sensing parameter is smaller than a preset decibel, and the flight sensing parameter is greater than a preset light intensity.

11. The mobile device according to claim 9, the preset condition comprises at least one of the following conditions: the gravity sensing parameter is greater than a preset vibration amplitude, the sound sensing parameter is greater than a preset decibel, and the flight sensing parameter is smaller than a preset light intensity.

* * * * *